United States Patent [19]

Herkes

[11] 3,854,585
[45] Dec. 17, 1974

[54] CLEANING APPARATUS FOR MACHINE HARVESTED SUGAR CANE

[76] Inventor: John W. Herkes, 425 High St., Wailuku, Hawaii 96793

[22] Filed: Feb. 28, 1973

[21] Appl. No.: 336,414

[52] U.S. Cl. .................... 209/3, 209/12, 209/34, 209/94
[51] Int. Cl. ............................................ B07b 9/00
[58] Field of Search ..................... 209/3, 12, 2, 209/30–35, 94; 56/13, 3, 13.5, 13.9, 14.3; 171/133, 130, 131; 130/31 R; 83/401

[56] References Cited
UNITED STATES PATENTS

| | | | |
|---|---|---|---|
| 2,710,097 | 6/1955 | Bolles | 209/12 |
| 3,358,830 | 12/1967 | Duncan | 209/3 |
| 3,620,369 | 11/1971 | Steen et al. | 209/3 |
| 3,635,336 | 1/1972 | Chapman | 209/3 |
| 3,673,774 | 7/1972 | Mizzi | 56/13.9 |

*Primary Examiner*—Tim R. Miles
*Assistant Examiner*—Ralph J. Hill
*Attorney, Agent, or Firm*—William B. Walter

[57] ABSTRACT

Mechanical apparatus for cleaning dirty machine harvested sugar cane using a minimum of water or preferably no water at all has an inclined conveyor which elevates the machine harvested sugar cane deposited on it with a kickback blanket levelling and thickness limiting device at the upper end of the conveyor, a screening device receiving the material discharged from the inclined conveyor which screening device removes rocks, loosens, breaks up, and spreads the matted cane and extraneous material out on a second elevating conveyor beneath it, a cross-flow cutter, and a separating device receiving the loosened material passed through the screening device, which separating device removes extraneous material such as soil, leaves, sand, and small stones from the sugar cane stalks thus discharging generally clean sugar cane stalks with very little sugar loss in the cleaning process.

6 Claims, 5 Drawing Figures

CLEANING APPARATUS FOR MACHINE HARVESTED SUGAR CANE

RELATED APPLICATIONS

The Mechanical Screening Device of U.S. application Ser. No. 309,896 filed Nov. 27, 1972 and the Separating Device of U.S. application Ser. No. 336,425 filed Feb. 28, 1973 issued June 18, 1974 as U.S. Pat. No. 3,817,375 are elements of the invention as described and claimed in this application.

BACKGROUND OF THE INVENTION

The change in harvesting practices from hand cutting and handling to harvesting by heavy machines in the sugar cane industry has required improved processing methods at the factory to prepare the harvested material for sugar extraction. Almost all forms of machine harvesting have resulted in entangling of the sugar cane stalks with soil, sand, dust, rock, and fallen and attached leaves. A detailed description of typical machine harvesting and hauling operations creating the dirty entangled cane can be found in my copending application Ser. No. 309,896.

Thus the advent of mechanically harvested cane stalks now coming into widespread use by the sugar cane industry is resulting in rocks, sand, dirt, leaves, cane stumps and other undesirable material being mixed into the cane and entering the factory.

Before this dirty trashy cane can be economically processed into sugar it is necessary that much of the undesirable material be removed. Prior to my invention this has been accomplished in all but experimental installations by cane washing plants using water. Major shortcomings of cleaning cane with water are: (1) a considerable amount of sugar is washed out of the cane stalks which have been broken or cracked open in many places, (2) the disposal problems of large quantities of dirty water containing dissolved solids such as sugar which results in unpleasant odors when allowed to stagnate, (3) the high cost of water in some areas, and (4) the high cost of disposal of the wet solids removed from the sugar cane.

Because of these high costs of cleaning with water there has been a concerted program to develop methods to clean machine harvested cane by mechanical and air blast methods not involving water both in the field and in the factory. Apparatus of this type as described in Bolles U.S. Pat. No. 3,384,233 has been tested extensively but as yet has not been sufficiently accepted to be depended upon for production processing.

The entanglement of tough sugar cane stalks with intermixed boulders, soil, sand, sugar cane stumps and leaves as found in machine harvested cane has been so tight a bundle and mat that sugar technologists with many years of field and factory experience have been virtually unable to clean machine harvested cane except by brute force and the use of great amounts of water. In standard practice large rocks and boulders are removed by subjecting the cane to a very aggressive beating by steel arms and afterwards removed by hand. Cane from rocky areas is often passed through a tank or flume of water so that rocks will sink to the bottom for removal while the cane stalks pass on to another conveyor. Here also much sugar is lost. An essential element lacking in waterless cleaning methods prior to my invention has been an effective means to remove large rocks down to the size of small stones before passing the material through saws to cut the cane stalks into short lengths to facilitate removal of leaves clinging to the stalks. Rocks must be removed to prevent damage to the saws and to other machinery of sugar extraction apparatus.

BRIEF SUMMARY OF THE INVENTION

The primary object of my invention is to effectively clean machine-harvested sugar cane by a method which will result in very little loss of sugar and very little damage to the sugar cane stalks.

Another object of my invention is to effectively clean machine-harvested sugar cane by a method using a minimum of power and little, if any, water.

Another object of my invention is to effectively clean machine-harvested sugar cane by machinery which is mechanically dependable and simple.

This invention is a continuous flow conveying and separating device which will convert large multi-ton piles of machine harvested long or short stalk sugar cane and extraneous material placed on its intake into separated discharges of clean sugar cane stalks and extraneous materials. The invention consists of an inclined elevating conveyor with powered levelling rolls near its upper end, a mechanical screening device which receives the material discharged from the elevating conveyor, a second elevating conveyor which receives material falling through the screening device, a cross-flow cutter on the second elevating conveyor which cuts long stalks into short stalks before they are discharged from the conveyor, and an inclined mechanical separating device down which the stalks, and extraneous materials slide comprised of power-rotated spaced pocketed rollers which catch and feed the extraneous materials between the rolls and thus separating them from the cane stalks sliding down over the rolls into a discharge chute.

BRIEF DESCRIPTION OF THE DRAWINGS

Preferred embodiments of my apparatus for cleaning machine-harvested sugar cane are illustrated in the accompanying drawings wherein.

More detailed drawings and a description of the screening device are included in application Ser. No. 309,896 filed Nov. 27, 1972 and of the separating device in application Ser. No. 336,425 filed Feb. 28, 1973 issued June 18, 1974 as U.S. Pat. No. 3,817,375.

DETAILED DESCRIPTION OF THE INVENTION

Figure 1:
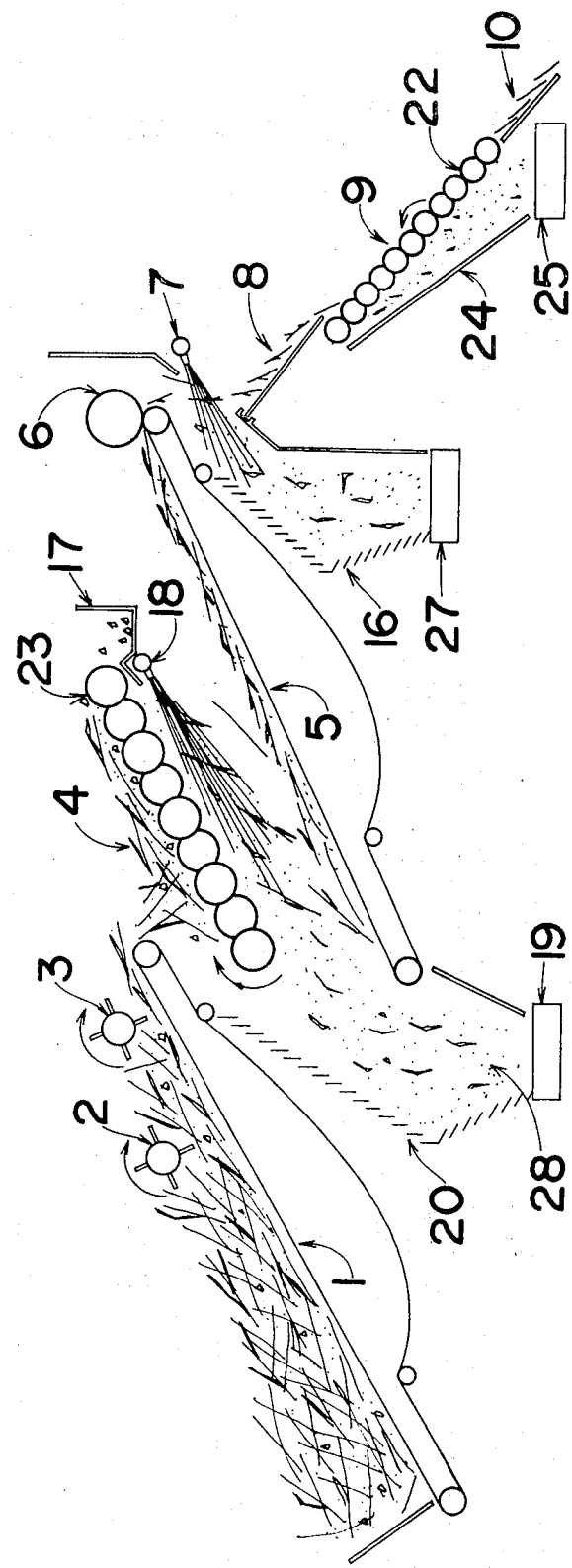
FIG. 1 is schematic side elevation of one preferred arrangement of machinery capable of receiving dirty machine harvested sugar cane and discharging clean sugar cane free of extraneous material.

The preferred embodiment of my invention of apparatus for cleaning dirty machine harvested sugar cane for further processing into sugar is illustrated in FIG. 1 of the drawings. Referring to this figure my apparatus comprises an inclined receiving conveyor 1 which elevates the loads of sugar cane past load leveller rolls 2 and 3 to drop onto screening device 4. Passing through the screening device 4 in which the mat of cane stalks and other materials is broken up into loose material, this material drops onto a second elevating conveyor 5.

The loose material is elevated on this conveyor 5 through a cross-flow cutter comprising circular saws 6 which cut many of the cane stalks into short lengths. The loose material is then dropped through an air blast from a blower 7 onto an inclined receiving plate 8 to cascade down over a separating device 9. This delivers clean cane stalks to its discharge chute 10. A more detailed description of the various elements of my apparatus to assist in the understanding of its construction and to insure successful operation of its cleaning function is included below.

The size and general construction of my receiving conveyor is essentially not new in the art. However, I have found that if this conveyor is inclined at an angle preferably in the range of thirty to 35° above the horizontal but up to 40° above the horizontal levelling rolls 2 and 3 can redistribute uneven piles proceeding up the conveyor with little effort and with little damage to the cane stalks as excess material merely tumbles back down the conveyor. The receiving conveyor 1 is preferably driven at a speed of 35 to 40 feet per minute but may be driven as slow as 20 feet per minute.

Figure 2:
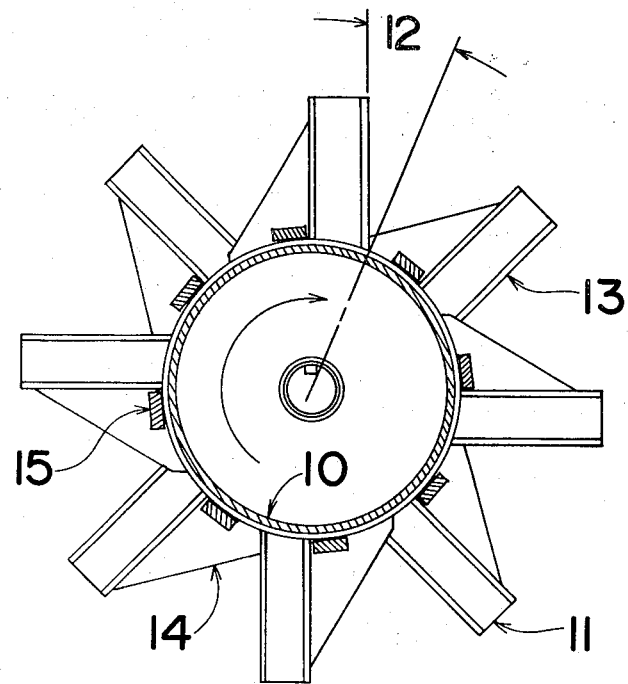
FIG. 2 is an end view of a leveller roll.
Figure 3:
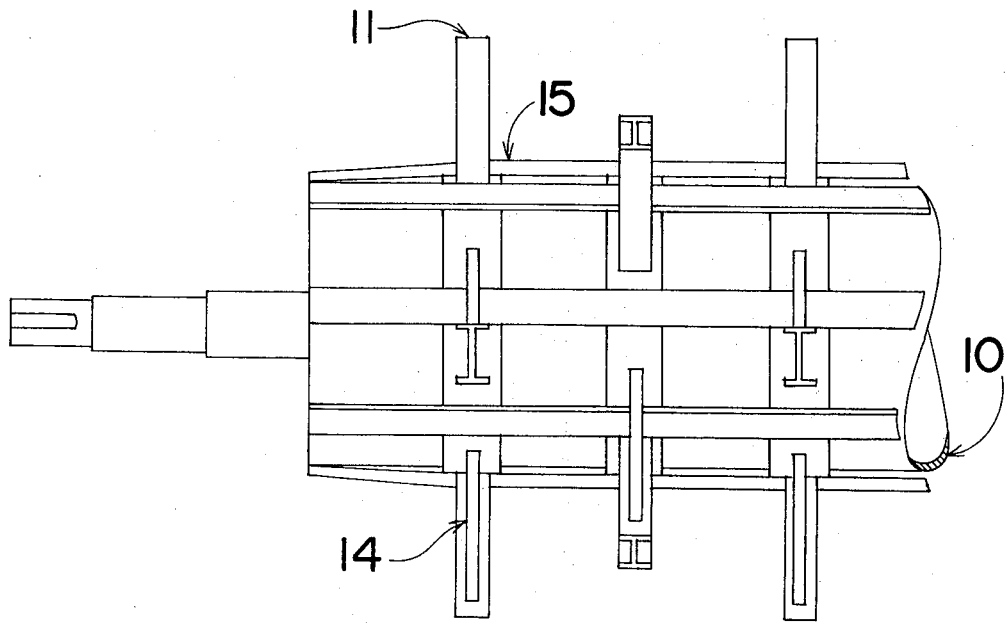
FIG. 3 is a plan view of the leveller roll showing the teeth in end view and a typical spacing between teeth.

Each of the levelling rolls 2 and 3 as illustrated in detail in FIGS. 2 and 3 is composed of a heavy steel cylinder 10 thirty to fourty inches in outside diameter having a projecting arms 11 which are about eighteen inches long attached to the outside of the cylinder. My cylinders are greater in diameter than the usual rolls used for various purposes in sugar cane machinery. This roll diameter contributes to strength and eliminates the tendency of cane stalks to wrap around the rolls.

The arms 11 are arranged four to a row with the rows eighteen inches apart. The arms 11 are made from a heavy 6 inch I-beam having a flange about 3½ inches wide thus presenting a wide face to the cane stalks for minimum damage to the stalks.

The levelling roll arms 11 are attached to the roll periphery with a sweepback angle 12 on the leading edge 13 of 20° to 30° from radial to cause the cane stalks and rocks to slide off the rotating arms. One inch thick steel gussets 14 reinforce the arms 11 and one by 4 inch steel plates 15 across the roll cylinders 10 between arms strengthen the cylinders and contribute to the long lift and wear of the rolls 2 and 3. The levelling rolls 2 and 3 are power driven at a top speed of eight hundred feet per minute in a direction opposing the flow of cane up the receiving conveyor.

The first or lower levelling roll 2 is preferably spaced above the conveyor surface so as to allow a blanket thickness of about eighteen inches to pass underneath it. The second levelling roll 3 is then spaced for a blanket thickness of about 14 inches. If only one levelling roll is used, which would be satisfactory in some instances, a sixteen inch clearance beneath the roll would be preferred.

Figure 4:
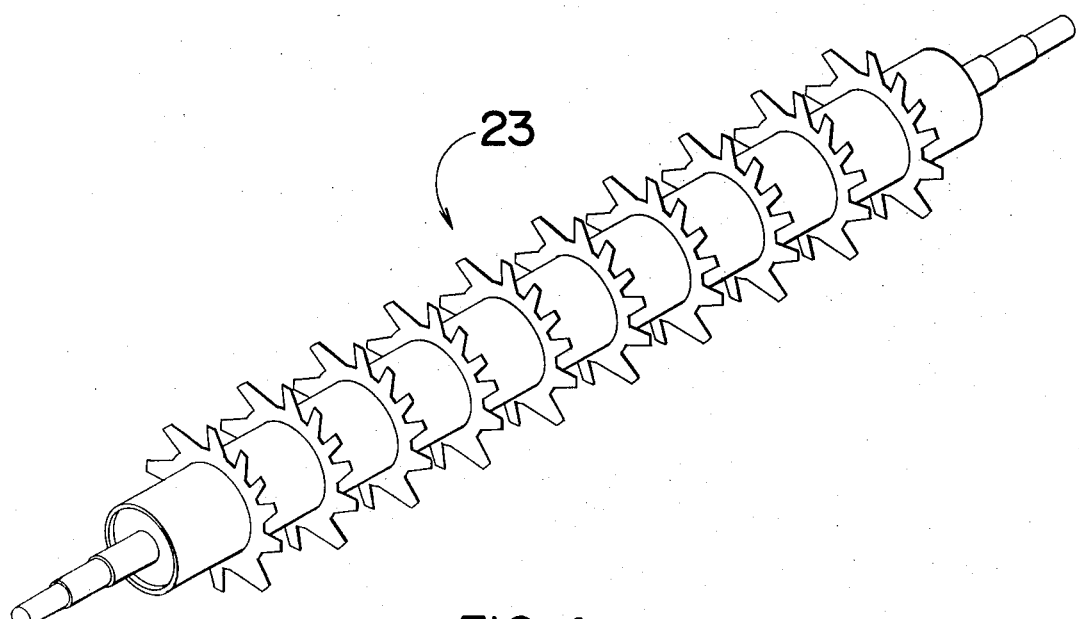
FIG. 4 illustrates a typical roll as used in the screening device.

The screening device 4 is illustrated, described and claimed in my copending application Ser. No. 309,896 filed Nov. 27, 1972. In brief, it consists of a series of spaced parallel toothed rolls 23 as illustrated in FIG. 4 supported on bearings on an incline of about 30° from the horizontal. The toothed rolls 23 are power driven at a peripheral speed of more than 350 feet per minute in a direction to move the mat of material dropped on it up the incline. The speed of the material moving through the last rolls 23 of the screening device will be 50 to 60 feet per minute. A rock receiver 17 is provided at either or both ends of the screening device 4.

A blower 18 is provided under the screening device to drive light material falling through the screening device so as to fall free of the second elevating conveyor 5 and onto trash conveyor 19. Screening walls 20 are used to direct material in the air blast so as to fall onto the trash conveyor 19. The blower must be adjusted in velocity and direction so as to deflect a maximum of light extraneous material into the trash conveyor with all cane stalks dropping onto the second elevating conveyor 5.

The elevating conveyor 5 is of conventional design longer than the screening device 4 extending on beyond it in the direction of travel of the material, and preferably will move the material at a surface speed of about 60 to 70 feet per minute. Sufficient elevation of material will be required to allow a free fall of about ten feet to the receiving plate 8 and to accomodate an overall height of 16 to 20 feet of the separating device 9. The circular saws 6 at the upper end of the second elevating conveyor 5 may be of the type described in Bolles U.S. Pat. No. 3,464,470 although other designs of cross flow cutters for cutting cane stalks travelling on a conveyor into short lengths will suffice.

Figure 5:
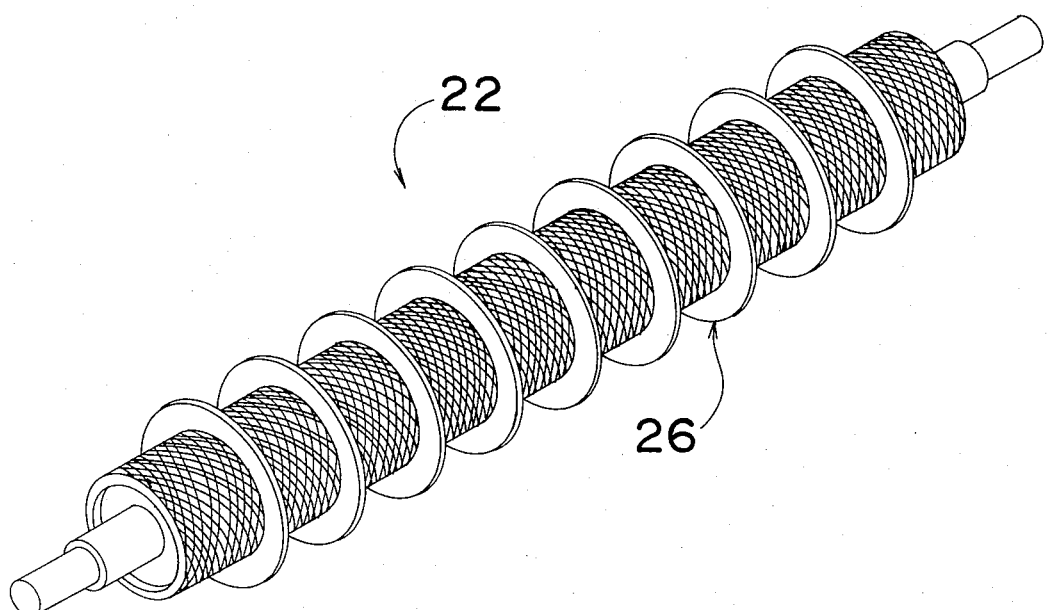
FIG. 5 illustrates a typical roll as used in the separating device.

The separating device 9 is illustrated, described and claimed in my copending application Ser. No. 336,425 filed Feb. 28, 1973 issued June 18, 1974 as U.S. Pat. No. 3,817,375. In brief it consists of an adjustable angle inclined receiving plate 8 to control the speed of the material, pocketed rolls 22 which are power driven to oppose the flow of material cascading over them, a discharge chute 10 for clean cane and a waste chamber 24 with waste conveyor 25. The pocketed rolls 22 as illustrated in FIG. 5 have spaced guard rings 26, to carry the cane stalks over the rolls while allowing waste material to be carried through the pocketed rolls 22.

MODE OF OPERATION OF THE INVENTION

In operation, heavily matted and dirty machine-harvested sugar cane from the field requiring no prior cleaning may be deposited in piles on the receiving conveyor 1 on which it is elevated up the first levelling roll 2. The arms of this roll strike all material which is more than 18 inches high above the conveyor causing it to cascade on down the steep conveyor to fill blanks between piles and allowing a maximum blanket thickness of 18 inches to pass. Large rocks mixed into the cane are also driven down to the foot of the conveyor 1 where they may be removed by a small back hoe, manually, or by other means. The 18 inch blanket of material is further reduced in thickness to a maximum of 14 inches in similar fashion by load leveller roll 3 and more rocks are driven down the conveyor by this roll. The receiving conveyor 1 in combination with the levelling rolls 2 and 3 thus reduce uneven piles of matted cane and other materials into a blanket with a maximum thickness of 14 inches and simultaneously remove large rocks and elevate the material to the screening device 4. It will be appreciated that removal of large rocks on the receiving conveyor will reduce the maintenance costs and down time on the screening device 4 and that control of the thickness of the blanket of material fed to the screening device 4 to about 14 inches allows for some separation of material as it falls off the end of conveyor 1 and permits the toothed rolls 23 of the screening device 4 to completely separate and feed all materials except large rocks down through the toothed rolls so that no cane is deposited in the rock receiver 17.

At each succeeding stage, the inclined receiving conveyor 1, the screening device 4, and the elevating conveyor 5 the surface speed of the material is increased thus reducing the thickness of the blanket and separating the material to allow effective removal of extraneous material from the sugarcane stalks at the separating device 9. Thus in a preferred operation the material will be moving at a surface speed of about 35 feet per minute on the receiving conveyor 1 which will be increased to 50 to 60 feet per minute as it passes through the screening device 4 and increased to 60 to 70 feet per minute on the elevating conveyor 5.

As the blanket of material moves across and through between the rolls of the screening device 4 it is vigorously shaken and stalks separated so as to loosen extraneous materials both adhered to and intertwined with the cane stalks therefrom.

As it falls through the screening device toothed rolls 23 many leaves and other light materials are blown free of the cane into the waste chamber 28 while most soil, small stones, sand, leaves, and sugar cane stalks fall onto elevating conveyor 5 where they are generally separated and spread out because of the separating action of the screening device 4, acceleration of the material due to the increased speed of the rolls 23 from beginning to end of the screening device 4, and increased speed of the elevating conveyor 5.

The base of the sugar cane leaves is tightly wrapped around the stalk and becomes progressively free of the stalk with the length of the leaf. The top of the cane stalks is comprised solely of leaf material. Machine-harvested sugar cane includes fallen and loose leaves along with those leaves still tightly adhered to the stalk. It is essential that as little leaf and cane tops as possible be processed with the cane stalks into sugar as the leaves and cane tops contain very little sugar and can degrade the sugar. Also since all fibrous wastes from sugar processing carry with them some sugar juice, leaves and tops should be removed and discarded prior to processing.

The circular saws 6 at the top of the elevating conveyor 5 cut the cane stalks into short lengths freeing leaf portions and tops from their attachment to the stalk. Leaves and tops thus freed from the stalks and other leaves and light material are blown towards screening walls 16 and trash conveyor 27 by blower 7 while material is falling off conveyor 5 onto the inclined receiving plate 8 of the separating device 9.

The angle of the inclined plate 8 is so adjusted as to slow down the flow of material onto the pocketed rolls 22 to the minimum needed for the clean stalks to reach the discharge chute 10. Thus the remaining extraneous material is more readily stopped and engaged by the pocketed rolls 22 to be carried by them between the rolls to fall into waste chamber 24. Cane stalks passing down across the rolls are kept from passing between the rolls by the guard rings and those sliding down lengthwise bridge the gaps between rolls and thus are not passed therethrough.

The combination of elements in my sugar cane cleaner has simultaneously and cooperatively achieved two heretofore unattained functions. These are as follows:

1. Rock Removal

In combining levelling rolls on a receiving conveyor for machine-harvested sugar cane with my screening device following, I have found it possible to receive push rake, V-cut, or grab harvested long stalks cane, remove large rocks with the levelling rollers on the receiving conveyor and smaller rocks on the screening device. Rock removal before cutting the cane into short stalks allows trouble free operation of the cross flow cutter as well as relieving the separating device rollers of high wear, down time and maintenance. Rock removal without the use of water reduces sugar losses to an acceptable level and brings other benefits as mentioned earlier.

2. Separation of Cane Stalks from Extraneous Material

In combining levelling rollers on a receiving conveyor with my mechanical screening device, accelerated travel on screening device and second elevating conveyor and sliding short cut cane stalks, leaves and tops down over my separating roller I have found it possible to reduce large piles of heavily matted entangled long cane stalks, soil, rocks and leaves into separated pieces of short cane stalks, small stones, soil, and leaves which can be separated into two distinct flows of material; i.e., (a) clean cane stalks, and (b) extraneous material. By accomplishing this result without water I have also reduced sugar losses to an acceptable level.

I claim:

1. Apparatus for cleaning machine harvested sugar cane comprising:

a. a first inclined elevating conveyor having a power drive means operatively connected to the conveyor to discharge from the upper end materials placed on the lower end;

b. a material thickness control means operatively connected to the first inclined conveyor to limit the thickness of the blanket of material being discharged;

c. a mechanical screening device comprised of a multitude of toothed rollers having support means holding the rollers in a parallel spaced relationship on an incline with its lower end positioned to receive material discharged from the first conveyor and having drive means operatively connected to the rollers to rotate the rollers in a direction to both pull material through the space between rollers and to spread material on up the incline;

d. a rock receiver at one end of said mechanical screening device;

e. a second inclined elevating conveyor having a supporting means holding the second conveyor in a position generally parallel in inclination with and below the mechanical screening device, said second elevating conveyor being longer than said screening device with the upper end of the second conveyor being out from under the mechanical screening device and having a power driving means operatively connected to the conveyor to discharge materials deposited thereon from the upper end;

f. a cross flow cutter operatively connected to and above the upper portion of the second elevating conveyor and in spaced relationship therewith so as to cut long cane stalks into short lengths for discharge from the second conveyor; and g. a material separating device comprising a series of parallel spaced generally horizontal pocketed rolls, a receiving plate, a waste receiver, a supporting means positioning the receiving plate and pocketed rollers on an incline with the receiving plate interposed on the incline between the discharge end of the second conveyor and the pocketed rolls to direct material discharged from the second conveyor onto the pocketed rollers and supporting the waste receiver beneath the pocketed rollers and driving means operatively connected to the pocketed rolls to rotate the rolls in a direction opposing the flow of material down the incline such that extraneous material caught in the pocketed surfaces will be carried up and over each roll and dropped beneath the rolls into the waste receiver with the clean cane stalks sliding down over the pocketed rolls for discharge separately from the extraneous material.

2. Apparatus for cleaning machine harvested sugar cane as claimed in claim 1 wherein the drive means rotating the toothed rollers of the mechanical screening device is adapted to drive the rollers at a speed such that the linear velocity of the material leaving the first inclined conveyor is increased as it passes through the mechanical screening device thus spreading the material out.

3. Apparatus for cleaning machine harvested sugar cane as claimed in claim 1 wherein the drive means operating the second elevating conveyor is adapted to move the materials deposited thereon at a higher speed than the forward speed of the materials leaving the mechanical screening device thus spreading the material out.

4. Apparatus for cleaning machine harvested sugar cane as claimed in claim 1 also comprising a blower with supporting means positioning it underneath the screening device so as to blow light material falling through said screening device away from the second conveyor.

5. Apparatus for cleaning machine harvested sugar cane as claimed in claim 1 also comprising a blower with supporting means positioning it underneath the upper end of the second conveyor so as to blow light material falling off the end of said conveyor away from said separating device.

6. Apparatus for cleaning machine harvested sugar cane as claimed in claim 1 in which the material thickness control means comprises a toothed roller, supporting means operatively connecting the toothed roller in spaced relationship to the first inclined elevating conveyor above the across the incline and driving means operatively connected to the toothed roller to rotate it in a direction opposed to the direction of flow of material up the inclined conveyor, said spaced relationship between conveyor and toothed roller being set to control the passage of material beneath the roller to a maximum depth of about 14 inches. Substitute the new drawing FIG. 1 for the original FIG. 1 which was found defective due to lack of heading space.

* * * * *